(12) United States Patent
Kurosawa (10) Patent No.: US 7,024,986 B2
(45) Date of Patent: Apr. 11, 2006

(54) SYSTEM AND METHOD FOR MAKING POPCORN USING A SELF-REGULATING HEATING SYSTEM

(75) Inventor: Kenzo Kurosawa, Yokohama (JP)

(73) Assignee: Gakken (Hong Kong) Co., Ltd., (HK)

( * ) Notice: Subject to any disclaimer, the term of this patent is extended or adjusted under 35 U.S.C. 154(b) by 108 days.

(21) Appl. No.: 10/678,496

(22) Filed: Oct. 3, 2003

(65) Prior Publication Data

US 2004/0103793 A1    Jun. 3, 2004

Related U.S. Application Data

(60) Provisional application No. 60/416,375, filed on Oct. 4, 2002.

(51) Int. Cl.
    *A23L 1/00*    (2006.01)
    *A23L 1/18*    (2006.01)

(52) U.S. Cl. .................................. 99/323.9; 99/323.5

(58) Field of Classification Search ............. 99/323.9, 99/323.5, 323.11, 323.8, 323.7, 323.6
    See application file for complete search history.

(56) References Cited

U.S. PATENT DOCUMENTS

| | | | |
|---|---|---|---|
| 1,818,276 A * | 8/1931 | Rossebo et al. ............ 99/323.9 |
| 2,607,283 A * | 8/1952 | Crank ........................ 99/323.8 |
| 3,554,115 A | 1/1971 | Manley |
| 3,570,388 A * | 3/1971 | Gottlieb ..................... 99/323.5 |
| 3,722,399 A | 3/1973 | Cole |
| 3,756,139 A | 9/1973 | Wolens |
| 4,182,229 A | 1/1980 | VandeWalker |
| 4,288,686 A | 9/1981 | Cretors |
| 4,307,657 A | 12/1981 | Avery |
| 4,397,874 A | 8/1983 | Piotrowski |
| 4,445,427 A | 5/1984 | Kiczek |
| 4,596,713 A | 6/1986 | Burdette |
| 4,823,683 A | 4/1989 | Meisner |
| 4,849,233 A | 7/1989 | Hemker |
| 4,850,120 A | 7/1989 | Stein |
| 4,881,457 A | 11/1989 | Lyga et al. |
| 4,888,186 A | 12/1989 | Cooley et al. |
| 4,888,465 A * | 12/1989 | Hoffmann ................... 392/467 |
| 4,888,466 A * | 12/1989 | Hoffmann ................... 392/444 |
| 4,947,740 A | 8/1990 | Strawser |
| 5,190,777 A | 3/1993 | Anderson et al. |
| 5,657,684 A | 8/1997 | Chaikowsky |
| 5,662,024 A | 9/1997 | Cretors et al. |
| 5,743,172 A | 4/1998 | Weiss et al. |
| 5,747,080 A | 5/1998 | Lemke et al. |
| 5,871,792 A | 2/1999 | Weiss et al. |
| 6,000,318 A | 12/1999 | Weiss et al. |
| 6,092,458 A | 7/2000 | Weiss et al. |

(Continued)

FOREIGN PATENT DOCUMENTS

DE          4323788         12/1994

(Continued)

*Primary Examiner*—Reginald L. Alexander
(74) *Attorney, Agent, or Firm*—Baker & McKenzie LLP (57) ABSTRACT

The present application describes a popcorn maker including a self-regulating heating unit. The self-regulating heating unit provides a regulated heat to the popcorn maker. The self-regulating heating unit can be configured to maintain a predetermined temperature for the popcorn maker. The predetermined temperature can be adjusted to provide appropriate amount of heat to the popcorn maker for popping a maximum number of corn kernels while limiting the heat from causing damage to heating coils and thermoplastic parts of the popcorn maker. The self-regulating heating unit includes a positive temperature coefficient heater.

12 Claims, 8 Drawing Sheets

U.S. PATENT DOCUMENTS

| | | |
|---|---|---|
| 6,187,353 B1 | 2/2001 | Wyman et al. |
| 6,234,063 B1 | 5/2001 | Evers et al. |
| 6,352,731 B1 | 3/2002 | Weiss |
| 6,354,191 B1 | 3/2002 | Weiss et al. |
| 6,378,795 B1 | 4/2002 | Kelly |
| 6,412,395 B1 | 7/2002 | Weiss et al. |
| 2002/0061348 A1 | 5/2002 | Weiss |

FOREIGN PATENT DOCUMENTS

| | | |
|---|---|---|
| DE | 19654337 | 6/1998 |
| EP | 0217368 | 4/1987 |
| EP | 0298711 | 1/1989 |
| EP | 0650906 | 5/1995 |
| FR | 2690049 | 10/1993 |
| JP | 57-12968 | * 6/1980 |
| JP | 56154960 | 11/1981 |
| JP | 62096054 | 5/1987 |
| JP | 62228245 | 10/1987 |
| JP | 62294056 | 12/1987 |
| JP | 1165350 | 6/1989 |
| JP | 2053441 | 2/1990 |
| JP | 2053442 | 2/1990 |
| JP | 3172146 | 7/1991 |
| JP | 3275474 | 12/1991 |
| JP | 2002106849 | 4/2002 |
| WO | WO9923895 | 5/1999 |
| WO | WO0213628 | 2/2002 |
| WO | WO0230218 | 4/2002 |

* cited by examiner

SYSTEM AND METHOD FOR MAKING POPCORN USING A SELF-REGULATING HEATING SYSTEM

PRIORITY CLAIM AND RELATED APPLICATION

The present application claims priority from U.S. Provisional Application entitled "A Popcorn Maker Employing a Self-Regulating Heating System," Ser. No. 60/416,375, filed Oct. 4, 2002, which is incorporated herein by reference in its entirety for all purposes.

TECHNICAL FIELD

The present invention relates generally to a system and method of making popcorn and, more specifically, to a system and method of making popcorn using a self-regulating heating system.

BACKGROUND

Generally, a popcorn maker includes a chamber for holding popcorn, a heater including a heating coil, and a fan. The chamber is typically included in a cabinet. The cabinet is typically configured using thermoplastic parts. The kernels of corn are placed inside the chamber where the kernels are heated by hot air produced by the heater and the fan. Typically, the heater in the popcorn maker consumes a large amount of power. For example, the heater of a typical 110 volts, 10.9 amperes popcorn maker requires an input power of about 1200 watts. The high power consumption by the heater can significantly increase the internal temperature of the cabinet. For example, if a typical popcorn maker is used for about two hours, then the internal temperature of the cabinet can rise above 100° C. Constant high power consumption over a long period of time can reduce the useable life of heating coils.

Additionally, high heat can also deform thermoplastic parts of the cabinet, which can cause permanent damage to the popcorn maker.

SUMMARY OF THE INVENTION

In an embodiment, a popcorn maker including a self-regulating heating unit is described. The self-regulating heating unit provides regulated heat to the popcorn maker. The self-regulating heating unit can be configured to maintain a predetermined temperature for the popcorn maker to provide appropriate amount of heat to the popcorn maker for popping maximum number of corn kernels while limiting the heat from causing damage to heating coils and thermoplastic parts of the popcorn maker. According to an embodiment, the self-regulating heating unit includes a Positive Temperature Coefficient (PTC) heater.

Typically, the PTC heater is configured as a ceramic stone, based on barium titanate. Initially, when voltage is applied across a PTC heater, the resistance of the PTC heater drops, allowing more current to flow through the PTC heater. The PTC heater begins to generate heat. When the heat generated by the PTC heater is sufficient to compensate for the loss of heat to the ambient, the PTC heater reaches a heat equilibrium state with the surrounding. At the heat equilibrium state, the resistance of the PTC heater increases significantly (e.g., by a factor of ten or more) resulting in a significant reduction in the current flow through the PTC heater. When, the ambient temperature decreases, the resistance of the PTC heater also decreases. Thus, drawing more current through the PTC heater resulting in an increase in the amount of heat generated. Similarly, when the ambient temperature increases, the resistance of the PTC heater also increases resulting in a decrease in the amount of heat generated.

The PTC heater can be configured to regulate heat at any given temperature. The given temperature at which the PTC heater regulates the heat is known as the Curie point of the PTC heater. The PTC heaters are also effective for voltage changes. For example, if the operating voltage of the PTC heater increases, then initially, the PTC heater consumes more power but its temperature also increases rapidly, which stabilizes the current, flowing through the PTC, relatively faster. Unlike traditional wire heaters with ohmic resistance, the performance of the PTC heater is not proportional to the square of the voltage. The PTC heater provides substantially the same wattage output for any given voltage. Therefore, the PTC heaters can be used for any voltage application (e.g., 120V AC, or 240V AC).

The PTC heater can be an effective low cost solution for applications requiring regulated heat because the PTC heater can provide a highly efficient source of regulated heat in a very small package, which allows the use of smaller enclosures. The PTC heater also provides lower operating costs because the power consumption varies according to the required temperature. Because the PTC heater has self-regulating temperature characteristic, it can be operated without the traditional need of thermostatic control.

In some embodiments, the self-regulating PTC heater regulates a given temperature for the popcorn maker. The given temperature can be high enough to pop the kernels of corn and low enough to prevent deformation of thermoplastic components of the popcorn maker. For example, in a ceramic chamber, the preset temperature of the PTC heater can be adjusted to be regulated around 290° C. Further, the temperature range for the ceramic surrounding of the PTC heater can be adjusted to be regulated around 200° C. Similarly, various different temperature settings can be used according to the composition of the material used for the PTC heater.

Also disclosed is a popcorn maker including a heating chamber with a self-regulating heating unit. The self-regulating heating unit includes a PTC heater to provide a regulated heat to the heating chamber. The heating unit is mounted on a vessel for holding corns. The popcorn maker further includes a fan loading system and a cabinet with a conical shaped interior for discharging popped kernels of corns to a container. A lid is provided to cover both the cabinet and the container for preventing the popped kernels of corns from popping out of the device and for guiding the popped kernels of corn into the container. In some variations, the popcorn maker includes a heating chamber without a fan loading system.

In some embodiments, a method of making popcorn is described. The method includes heating kernels of corn up to a preset temperature using a self-regulating heating system in a vessel of a popcorn maker, popping the kernels of corn, and collecting popped kernels of corn in a container using a conical bowl shaped popcorn guiding means.

DETAILED DESCRIPTION

Figure 1:
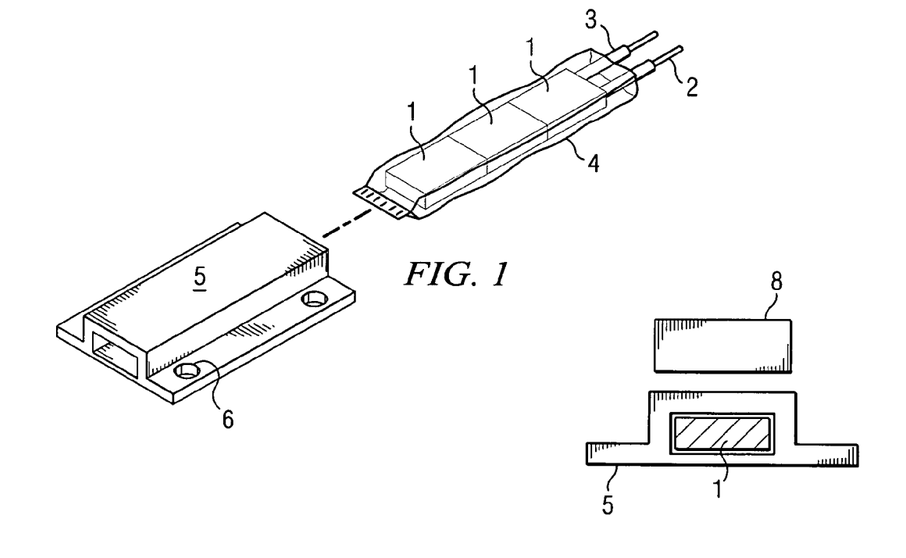
FIG. 1 illustrates various components of an exemplary self-regulating heating unit.

FIG. 1 illustrates various components of an exemplary self-regulating heating unit. The self-regulating heating unit includes one or more PTC heaters 1. The PTC heaters 1 can be configured in various shapes, such as, for example, a circular shape, a square shape, a rectangular shape, or the like. The number of the PTC heaters 1 in the self-regulating heating unit can be adjusted according to the surface area that is to be heated using the self-regulating heating unit and the required temperature. The PTC heaters 1 are coupled to two wires 2 for power supply connection. The wires 2 can be made of high heat resistant material and can be optionally enclosed in high heat resistant insulation tubes 3.

The PTC heaters 1 are enclosed in a high heat resistant bag 4. The high heat resistant bag 4 is then placed inside a hollowed aluminum bracket 5. The high heat resistant bag 4 provides electrical insulation between the hollowed aluminum bracket 5 and the PTC heaters 1. The hollowed aluminum bracket 5 has a plurality of holes 6 for fastening. One skilled in the art will appreciate that the hollowed aluminum bracket 5 can be adapted for fastening to a surface to be heated using various fastening means known in the art. The self-regulating heating system is formed using a press tool 8. The press tool 8 is used to press the top surface of the hollowed aluminum bracket 5 to ensure that the high heat resistant insulation bag 4 is properly positioned inside the hollowed aluminum bracket 5.

Figure 2:
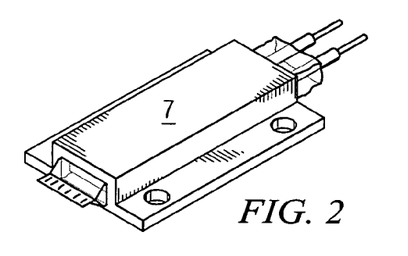
FIG. 2 illustrates an exemplary assembly of a self-regulating heating unit.

FIG. 2 illustrates an exemplary self-regulating heating unit 7 assembled using the individual components illustrated in the FIG. 1.

Figure 3:
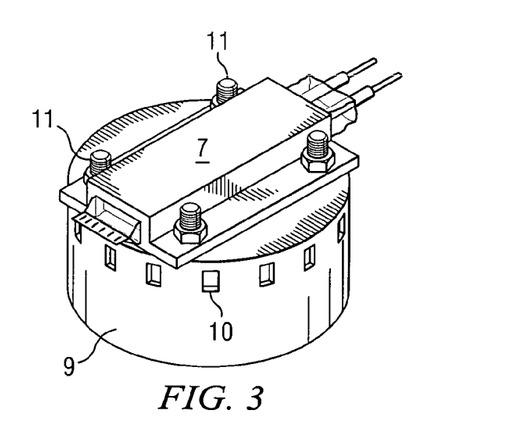
FIG. 3 illustrates a bottom view of an exemplary heating chamber of a popcorn maker configured using a self-regulating heating unit.

FIG. 3 illustrates a bottom view of an exemplary heating chamber of a popcorn maker configured using a self-regulating heating unit 7. The self-regulating heating unit 7 can include one or more PTC heaters. The heating chamber includes a vessel 9. The self-regulating heating unit 7 is mounted on the vessel 9 using screws 11. The vessel 9 includes one or more vents 10. The vents 10 allow air to flow in and out of the vessel 9. The heating chamber can be used in popcorn makers with various loading systems. For example, a fan loading system, a level loading system, a rotor loading system, a pulley loading system, a pushing bar loading system, a lever and gear set loading system, a rotary table loading system, and the like.

Figure 4A:
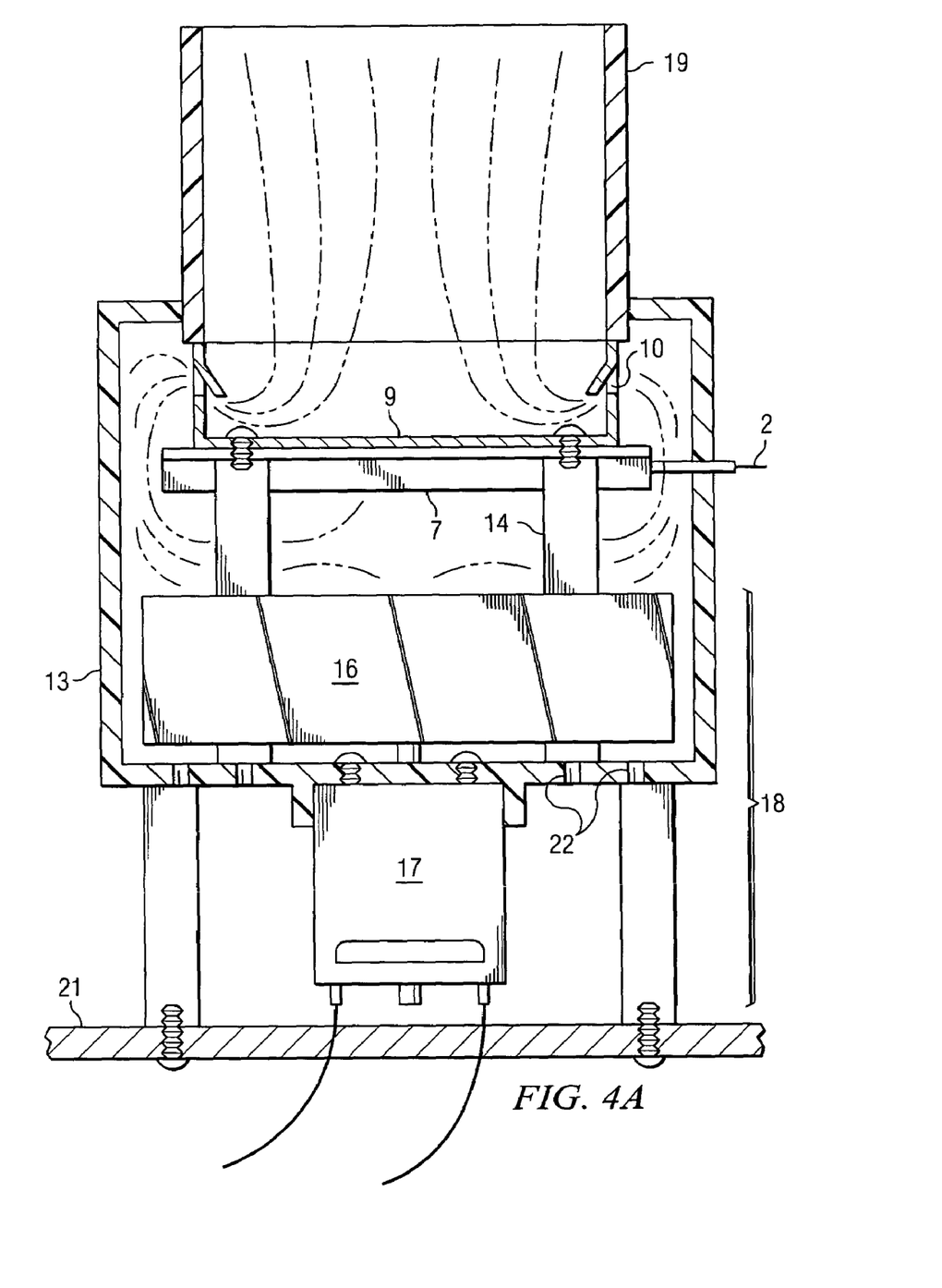
FIG. 4A illustrates an exemplary popcorn maker with a self-regulating heating unit configured using a fan loading system.

FIG. 4A illustrates an exemplary popcorn maker with a self-regulating heating unit 7 configured using a fan loading system. The self-regulating heating unit 7 can include one or more PTC heaters. A heating chamber for the exemplary popcorn maker is configured inside a receptacle 13 and under a tube 19. The heating chamber is supported by at least one but preferably four screw posts 14 for fastening. An air-driving device 18 is located below the heating chamber.

Figure 4B:
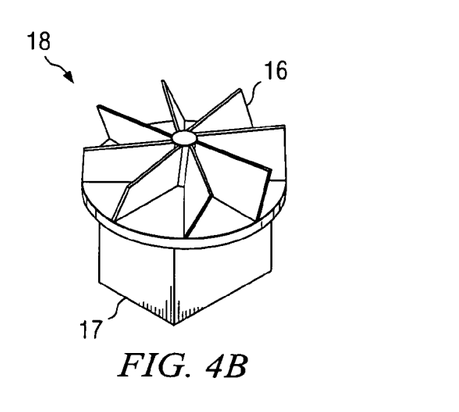
FIG. 4B illustrates an exemplary air-driving device for a popcorn maker.

FIG. 4B illustrates an exemplary air-driving device 18 for a popcorn maker. In the present example, the air-driving device 18 is a fan that includes an impeller 16 and a motor 17.

Referring to FIG. 4A, the impeller 16 is situated inside the receptacle 13, whereas the motor 17 is located outside the receptacle and mounted to the receptacle 13 with an appropriate fastening means. One skilled in the art will appreciate that the motor can be placed in any convenient location in the heating chamber. The receptacle 13 is sealed with a plurality of orifices 22 at its bottom. In the present example, the receptacle 13 is a cup made of phenol-formaldehyde or other material. The receptacle 13 includes orifices 22 at the bottom allowing air to be driven by the air-driving device 18 into the receptacle 13. The tube 19 can be made of phenol-formaldehyde or other material. The tube 19 is conjoined with and erected through the receptacle 13 into a cabinet (not shown) forming a passage. The passage is used to deliver the popped kernels of corn into the cabinet.

Figure 5:
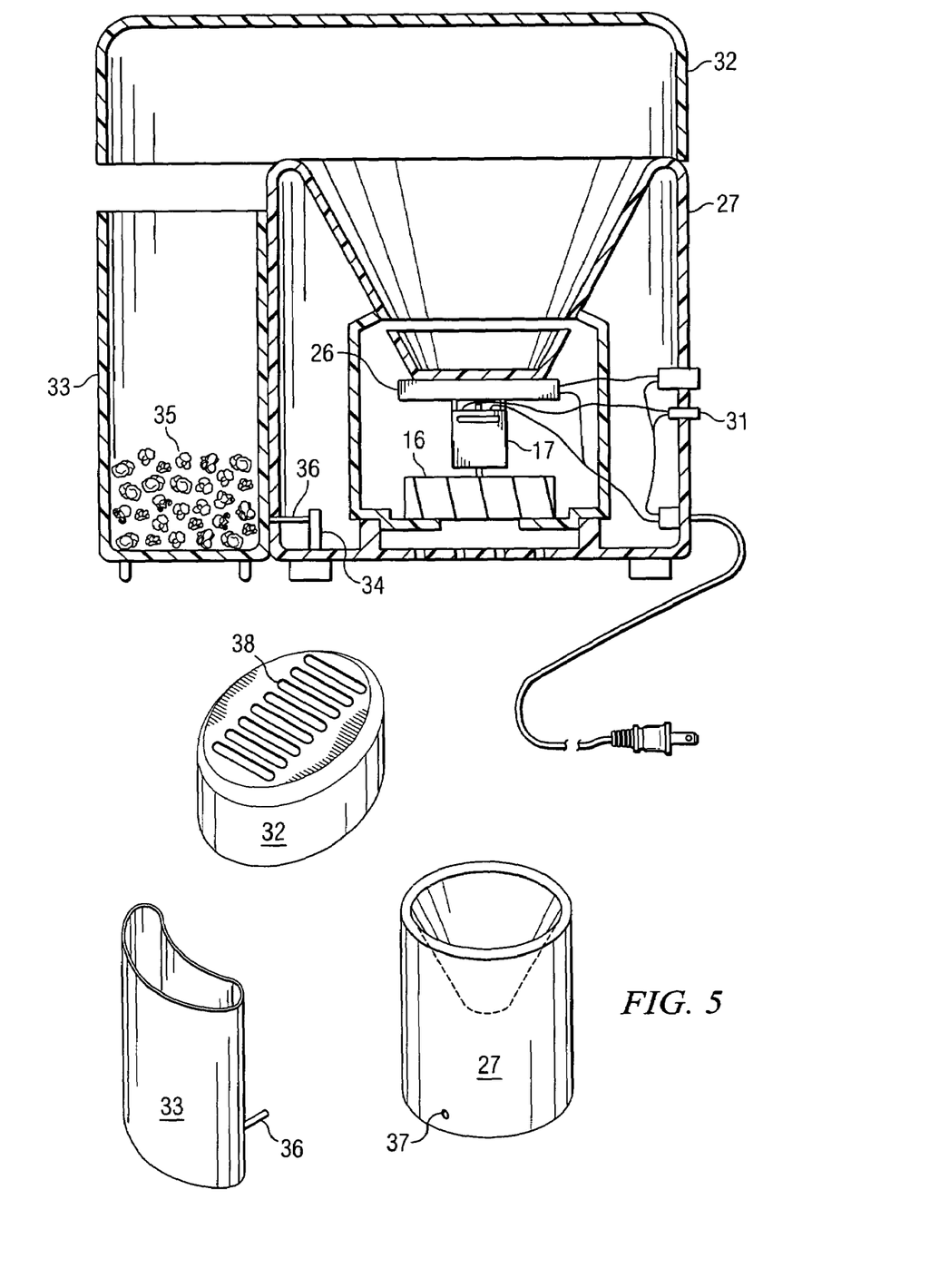
FIG. 5 illustrates a cross-sectional view of a popcorn maker with a self-regulating heating unit and a fan loading system.

FIG. 5 illustrates a cross-sectional view of a popcorn maker with a self-regulating heating unit 7 and a fan loading system. The self-regulating heating unit 7 can include one or more PTC heaters. A heating chamber 26 includes a vessel 9 for holding kernels of corn. The self-regulating heating unit 7 is mounted onto the vessel 9 and is configured to provide a regulated heat to the vessel 9. A fan loading system is located underneath the heating chamber 26. The fan loading system includes a cabinet 27 with a conical bowl shaped interior for discharging popped kernel of corn into a container 33. A lid 32 extending from the cabinet to the container is used to prevent the popped corn from popping out of the device as well as guiding the popped kernels of corn to the container. The lid 32 is large enough to cover both the cabinet and the container. A safety switch 34 is configured to engage a protrusion 36 on the container 33. A receptacle 13 includes the vessel. The container 33 is used to collect popped corn 35 from the heating chamber 26. The cabinet 27 has a conical-bowl shaped interior conjoined to the tube 19 of the heating chamber 26 thus, forming a passage for discharging popped corn to the container.

A safety switch 34 is set inside the cabinet 27 and is connected to a power supply. When the container is associated with the heating chamber 26, a protrusion 36 on the container is used to deactivate the safety switch allowing the current to flow through the heating chamber. However, when the container is taken away from the heating chamber (i.e., the protrusion is not connected to the safety switch), the safety switch is activated thereby ceasing the current flow to the heating chamber. The cabinet contains an aperture 37 at the bottom enabling the safety switch be activated or deactivated by the container. In addition, two switches are employed. One switch is a main switch 30, and another switch 31 is for the air-driving device. The main switch 30 is connected to the power supply with a power cord 29. Gaps 38 are provided in the lid 32 for the hot air to escape from the heating cabinet and the heating chamber. It will be appreciated that while the self-regulating heating unit 7 is operating, the fan can be turned off. This increases the heating efficiency by reducing the heat loss and eliminating the noise generated by the fan.

A user can deposit kernels of corn into the heating chamber by opening the lid 32. The user can turn-on the power for the self-regulating heating unit 7 to supply heat to the vessel 9. The air-driving device 18 can be turned-on when substantially all the kernels of corn are popped. The impeller 16 begins to rotate, driving air into the receptacle through the orifices at the bottom of the receptacle. As more air is driven into the receptacle, the air inside the vessel 9 begins to compress. The compressed air then forces itself into the vessel 9 from the vent 10. When the compressed air travels into the vessel, it pushes the popped kernels of corn out of the heating chamber and the cabinet into the container. When substantially all the popped kernels of corn are pushed into the container, the user can turn the air-driving device off and remove the popped kernels of corn from the container. When the container is taken away, the safety switch is activated thus, disabling the popcorn maker. When the user returns the container to the popcorn maker, the safety switch is deactivated and enables the popcorn maker for the next operation.

Figure 6:
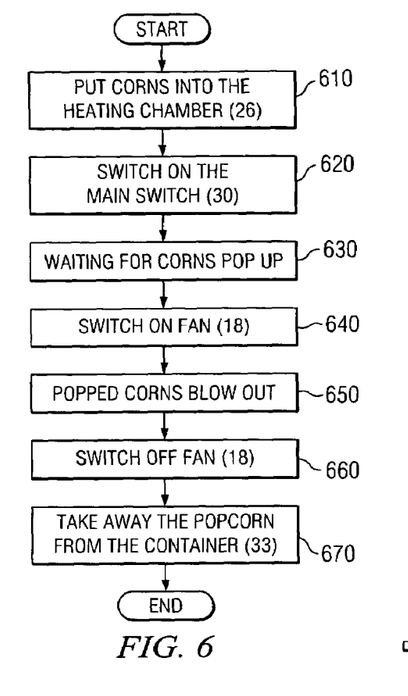
FIG. 6 is a flowchart illustrating an exemplary sequences of steps performed during a process of making popcorn using a popcorn maker with a self-regulating heating unit and a fan loading system.

FIG. 6 is a flowchart illustrating an exemplary sequences of steps performed during a process of making popcorn using a popcorn maker with a self-regulating heating unit and a fan loading system. Initially, the kernels of corn are placed into a heating chamber (610). The power switch is then turned on (620). A waiting period is required while the self-regulating heating unit heats the heating chamber (630). The fan is then turned-on to provide even airflow and direct the popped kernels of corn into a container (640). The kernels of corn then begin to pop (650). When substantially all the popped kernels of corn are collected into the container, the fan is then turned off (660). The popped kernels of corn are then removed from the container (670).

Figure 7:
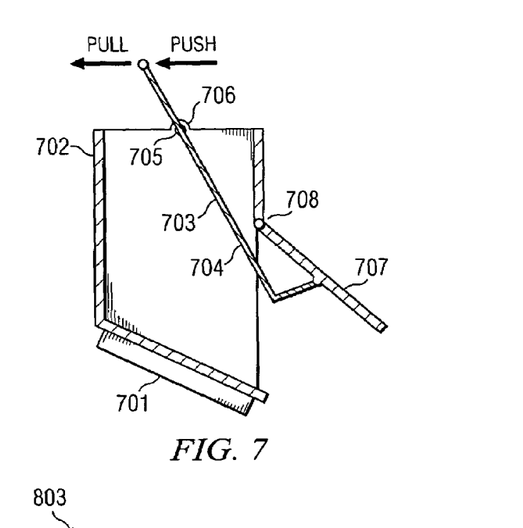
FIG. 7 illustrates a cross sectional view of a popcorn maker with a self-regulating heating unit and a lever loading system.

FIG. 7 illustrates a cross sectional view of a popcorn maker with a self-regulating heating unit 701 and a lever loading system. The self-regulating heating unit 701 can include one or more PTC heaters. The popcorn maker includes a heating chamber. The heating chamber includes a vessel 702 for holding kernels of corn. The self-regulating heating unit 701 is mounted on the vessel 702. The self-regulating heating system 701 is configured to provide a regulated heat to the heating chamber. Further, the popcorn maker includes a lever loading system 703. The lever loading system 703 includes a lever bar 704, a pivot bar 705, a hinge 706 for the pivot bar, a swinging door 707, and a hinge 708 for the swinging door 707. The swinging door 707 forms the bottom part of the vessel 702. The swinging door 707 and the vessel 702 are joined together by the hinge 706 allowing the swinging door 707 to swing outwardly.

The bottom of the vessel 702 has an inclined surface descending towards the swing door 707. The lever bar 704 includes an upper vertical section and a lower inclined section. The lever bar 704 is coupled to the swinging door 707 at its lower inclined section end. The pivot bar 705 is attached to the middle of the upper vertical section. The upper section of the lever bar 704 stands upright and is perpendicular to the pivot bar 705. The pivot bar 705 is placed horizontally across the vessel 702 and is secured to the vessel 702 using the hinge 706. Furthermore, a passage (not shown) is formed at the end of the inclined bottom of the vessel 702 to allow a user to collect the popped kernels of corn by placing a container below the passage.

The operating or driving mechanism can be carried out by hand, by gear system, by motor, and the like, or a combination thereof. Due to the gravity, the popped kernels of corn will pileup on the descended side of the bottom of the vessel 702. The user can open the swinging door 707 by pushing or pulling the lever bar 704. The swinging door 707 opens outwardly if the lever bar 704 is pushed in a direction away from the swinging door 707. By opening the swinging door 707, the popped kernels of corn fall onto the passage (not shown) where the user can collect the popcorn using a container.

A user can deposit kernels of corn into the vessel 702 and turn on the self-regulating heating units 701 to supply heat to the vessel 702 and the kernels of corn contained therein. When substantially all the kernels of corn are popped, the user can turn-off the self-regulating heating units 701 and push or pull the lever bar in a direction away from the swinging door. The swinging door opens and the popped kernels of corn fall out of the vessel onto the passage. The user can collect the popped corns by placing a container below the passage.

Figure 8:
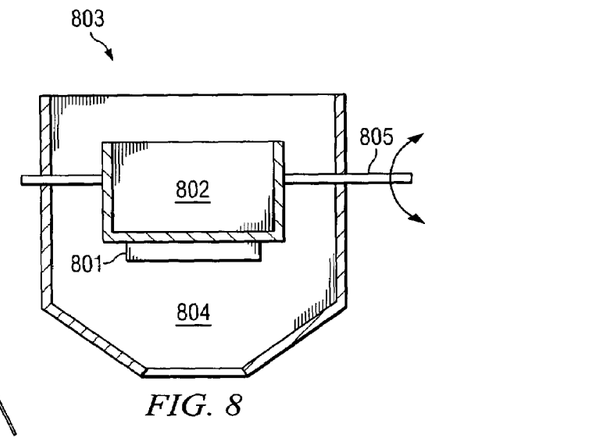
FIG. 8 illustrates a cross sectional view of a popcorn maker with a self-regulating heating unit and a rotor loading system.

FIG. 8 illustrates a cross sectional view of a popcorn maker with a self-regulating heating unit and a rotor loading system. The popcorn maker includes a heating chamber including a vessel 802 for holding kernels of corn. A self-regulating heating unit 801 is mounted on the vessel 802. The self-regulating heating unit 801 can include one or more PTC heaters. The self-regulating heating unit 801 is configured to provide a regulated heat to the heating chamber. The popcorn maker further includes a rotor loading system 803. The rotor loading system 803 is associated with the vessel 802. The popcorn maker further includes a cabinet 804, at least one supporting bar 805, and one turning handle (not shown). The heating chamber and the loading system 803 are placed inside the cabinet 804 with the supporting bar 805 traversing through the cabinet 804 and connecting to the turning handle. In the rotor system, the operating or driving mechanism may be carried out by hand, by motor with gear system to drive the support bar, or the like and a combination thereof. The vessel may be placed in a vertical position.

A user can deposit kernels of corn into the vessel and turn-on the self-regulating heating unit 801 to supply a regulated heat to the vessel 802 and the kernels of corn contained therein. When substantially all of the kernels of corn are popped, the user can then turn-off the self-regulating heating unit 801 and turn the turning handle. By turning the turning handle, the vessel 802 rotates and when the vessel 802 has been rotated to its upright position, the popped kernels of corn fall out of the vessel 802. The user can then collect the popped kernels of corn using a container.

Figure 9:
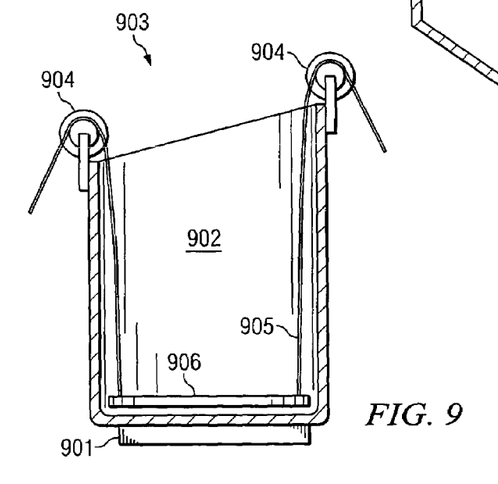
FIG. 9 illustrates a cross sectional view of a popcorn maker with a self regulating heating unit and a pulley loading system.

FIG. 9 illustrates a cross sectional view of a popcorn maker with a self-regulating heating unit and a pulley loading system. The popcorn maker includes a heating chamber. The heating chamber includes a vessel 902 for holding kernels of corn. A self-regulating heating unit 901 is mounted on the vessel 902. The self-regulating heating unit 901 can include one or more PTC heaters. The self-regulating heating unit 901 is configured to provide a regulated heat to the heating chamber. The popcorn maker further includes a pulley loading system 903. The pulley loading system 903 is associated with the vessel 902 and includes at least two pulleys 904 configured at the top of the vessel 902, at least one piece of string 905, and a plate 906. The self-regulating heating unit 901 is placed underneath the vessel 902. The vessel 902 can be configured using conductive materials such as, for example, aluminum or the like. A plate 906 is placed inside the vessel with a piece of the string 905 passing over the pulley fastened to the plate 906. A user can lift the plate 906 by pulling the free end of the string 905.

The user can deposit the kernels of corn inside the vessel and turn-on the self-regulating heating unit 901 to supply the regulated heat to the heating chamber. When substantially all of the kernels of corn are popped, the user can turn-off the self-regulating heating unit 901 and pull the free ends of the string 905 to lift the plate 906. When the plate 906 climbs up to the pulley 904, the popped kernels of corn falls out of the plate 906 and the user can collect the popped kernels of corn by placing a container at the lower end of the plate 906.

Figures 10, 11:
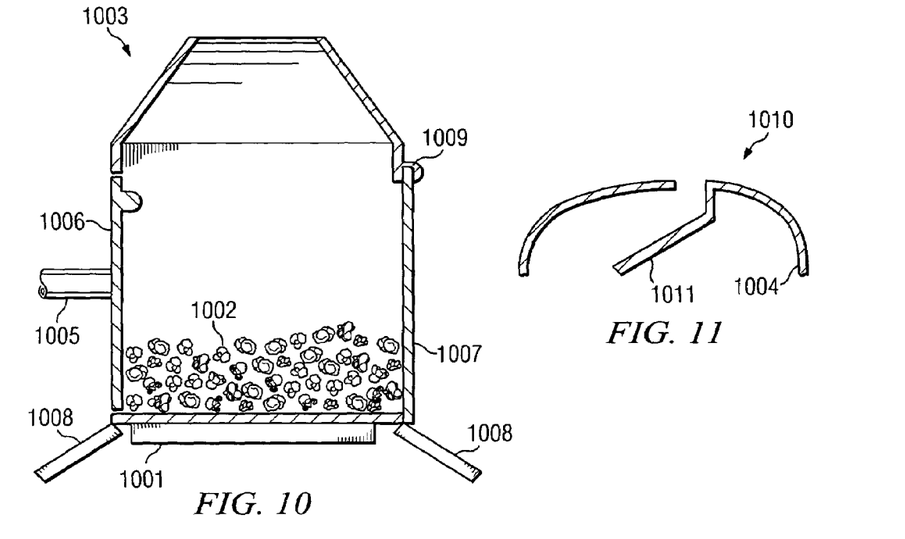
FIG. 10 illustrates a cross-sectional view of a popcorn maker with a self-regulating heating unit and a push bar loading system.
FIG. 11 illustrates a cross-sectional view of a top cover of the push bar loading unit having an inlet and an inclined plate.

FIG. 10 illustrates a cross-sectional view of a popcorn maker with a self-regulating heating unit 1001 and a push bar loading system 1003. The popcorn maker includes a heating chamber. The heating chamber includes a vessel 1002 for storing kernels of corn. The self-regulating heating unit 1001 is mounted on the vessel 1002. The self-regulating heating unit 1001 can include one or more PTC heaters. The self-regulating heating unit 1001 is configured to provide a regulated heat to the heating chamber. The push bar loading system 1003 includes a top cover 1004, at least one pushing bar 1005, at least one moving wall 1006, at least one swinging door 1007, and at least two inclined plates 1008. The vessel 1002 can be configured using thermally conductive material such as, aluminum or the like. The self-regulating heating unit 1001 is placed underneath the vessel 1002. At least two inclined plates 1008 descending from the bottom of the vessel 1002 are attached thereto on the opposite sides of the vessel 1002 to allow a user to collect the popped kernels of corn when the popped kernels of corn are pushed out of the vessel 1002.

A moving wall 1006 and a swinging door 1007 is placed immediately above the moving plates 1008. The swinging door 1007 is a part of the vessel 1002 and is connected to the vessel 1002 by a hinge 1009. The hinge 1009 enables the swinging door 1007 to swing outwardly. The moving wall 1006 is also a part of the vessel 1002 and is situated on a side opposite to the swinging door 1007. The moving wall 1006 has a pushing bar 1005 allowing it to be pushed towards or pulled away from the swinging door. The moving wall has a protrusion to open the swinging door when it is neared the swinging door 1007. A top cover 1004 is placed above the vessel 1002.

FIG. 11 illustrates a cross-sectional view of a top cover 1004 for a popcorn maker with push bar loading system as illustrated in the FIG. 10. The top cover 1004 includes an inlet 1010 and an inclined plate 1011. The inlet 1010 allows the kernels of corn to be deposited without opening the cover 1004 and at least one inclined plate 1011 below the inlet 1010 configured to provide a passage for the kernels of corn entering into the vessel 1002 and preventing the kernels of corn from popping out of the vessel 1002.

Figure 12:
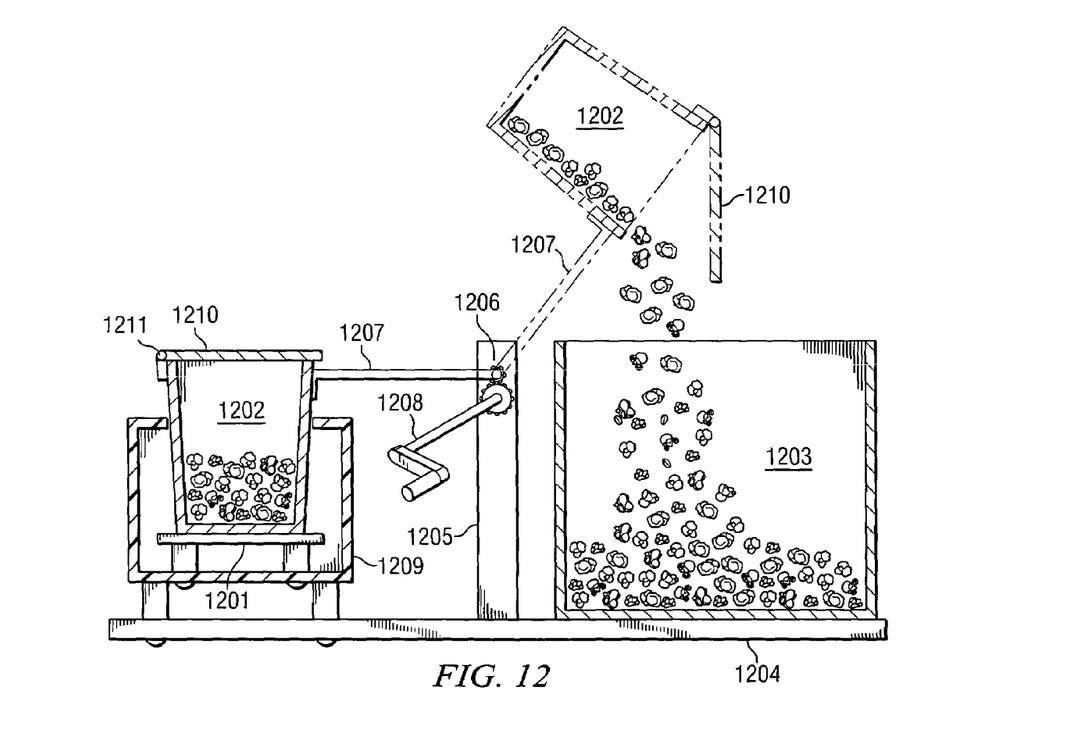
FIG. 12 illustrates a cross-sectional view of a popcorn maker with a self-regulating heating unit and a lever and gear set loading system.

FIG. 12 illustrates a cross-sectional view of a popcorn maker with a self-regulating heating unit and a lever and gear set loading system. The popcorn maker includes a heating chamber including a vessel 1202 for holding kernels of corn and a self-regulating heating unit 1201 mounted on the vessel 1202. The self-regulating heating unit 1201 can include one or more PTC heaters. The self-regulating heating unit 1201 is configured to provide a regulated heat to the heating chamber. The popcorn maker further includes a lever and gear set loading system 1200. The lever and gears set loading system 1200 includes a container 1203, at least one base 1204, at least one post 1205, at least one set of gears 1206 including at least two gears, at least one lever 1207, a handle 1208, and a cabinet 1209. The post 1205 is standing at the center of the base 1204 with the gears 1206 being mounted at the top. One of the gears is connected to a lever 1207 and the other is connected to a handle 1208 to control the movement of the lever by the handle. The cabinet 1209 occupies one side of the base 1204. The cabinet 1209 is affixed to the base by at least two screws. The self-regulating heating unit 1201 can be attached to the cabinet 1209 and the vessel 1202 can then be placed on the self-regulating heating unit for providing heat.

The cabinet 1209 has an open top allowing the vessel 1202 to move in and out of the cabinet 1209. The vessel 1202 is initially situated on the self-regulating heating unit 1201 with the top part of the vessel 1202 standing out of the cabinet 1209 and connected to the gear 1206 with the lever 1207. The vessel 1202 can be configured using thermally conductive material such as, aluminum or the like. The vessel 1202 includes a swinging cover 1210. The swinging cover 1210 is coupled to the vessel 1202 by a hinge 1211. A container 1203 is placed on the base 1204.

After placing the kernels of corn inside the vessel 1202 of the heating chamber, a user can turn-on the self-regulating heating unit. When the kernels of corn contained in the vessel 1002 are popped, the user can push the pushing bar 1005 towards the swinging door 1007 to force it open. When the swinging door 1007 is opened, the popped kernels of corn fall onto the inclined plate 1008 that is below the swinging door 1007. When the moving wall 1006 reaches the swinging door 1007, the popped kernels of corn fall onto the inclined plate 1008. The swinging door 1007 will be closed automatically due to the gravity. When the pushing bar returns to its original position, the remaining popped kernels of corn fall onto the other inclined plate that is on the side where the moving wall was originally situated where they can be collected by the user.

Figure 13:
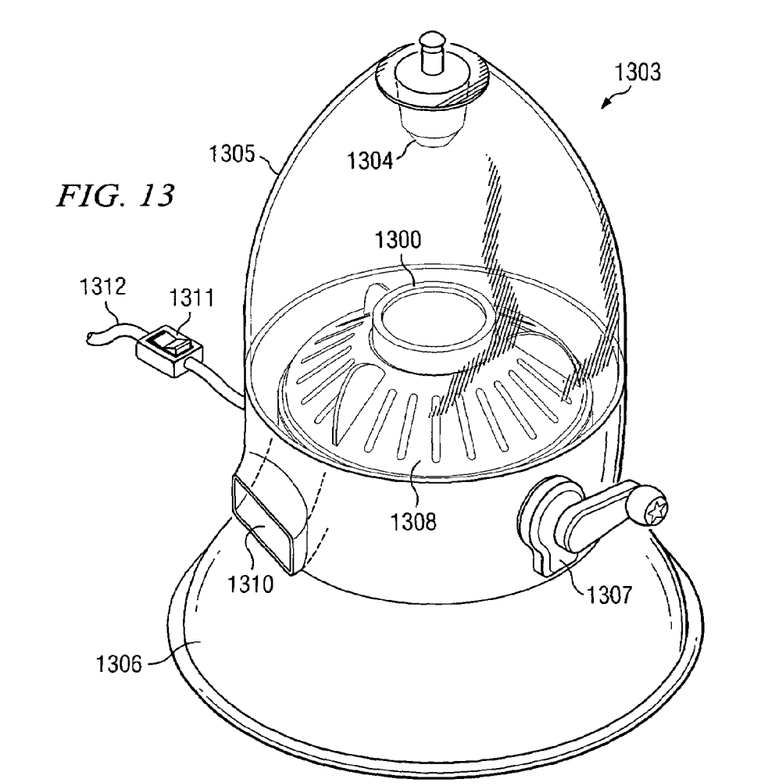
FIG. 13 illustrates a cross-sectional view of a popcorn maker with a self-regulating heating unit and a rotary table loading system.

FIG. 13 illustrates a cross-sectional view of a popcorn maker with a self-regulating heating unit 1301 and a rotary table loading system. The popcorn maker includes a heating chamber 1300. The heating chamber 1300 includes a vessel 1302 for holding kernels of corn. The self-regulating heating unit 1301 is mounted on the vessel 1302. The self-regulating heating unit 1301 can include one or more PTC heaters. The self-regulating heating unit 1301 is configured to provide a regulated heat to the heating chamber 1300. The popcorn maker further includes a rotary table loading system 1303 and a pre-heating storage unit 1304, a clear cabinet 1305, a power switch 1311, and a power cord 1312. The rotary table loading system 1303 includes a foundation 1306, at least one handle unit 1307, a rotary table 1308, and an outlet device 1310.

Figure 14:
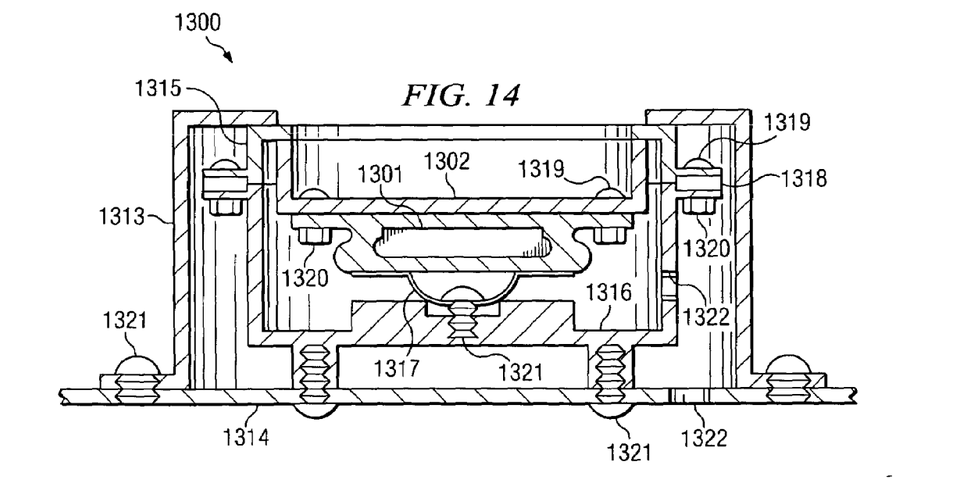
FIG. 14 illustrates a cross-sectional view of a heating chamber of the popcorn maker with the rotary table loading system.

FIG. 14 illustrates a cross-sectional view of a heating chamber 1300 of the popcorn maker with the rotary table loading system 1303 illustrated in the FIG. 13. The heating chamber 1300 includes an outer case 1313, a base 1314, an upper cabinet 1315, a lower cabinet 1316, at least one cross-shaped metal plate 1317, at least one or preferably four spring washer 1318, the vessel 1302, and the self-regulating heating unit 1301. The self-regulating heating unit 1301 is fastened to the vessel 1302 using at least two machine screws 1319 together with nuts 1320. One skilled in the art will appreciate that the self-regulating heating unit 1301 can be fastened to the vessel 1302 using any fastening means known in the art. The self-regulating heating unit 1301 is preferably placed at the center of the heating chamber 1300 and is surrounded by the upper chamber 1315 and the lower chamber 1316. The upper chamber 1315 and the lower chamber 1316 are joined together by at least one screw 1318 and the same number of nuts 1320.

Each of the outer case 1313 and the upper cabinet 1315 has an opening that is of the same size as the vessel 1302 to allow the kernels of corn to pop out of the heating chamber. At least one cross-shaped metal plates 1317 is employed therein to support the self-regulating heating unit 1301 on the lower cabinet 1316. The cross-shaped metal plate 1317 is secured at the center of the lower cabinet with at least one self-tapping screw 1321 or the like. The upper cabinet 1315 and lower cabinet 1316 are joined together by at least one, but preferably four, machine screws with spring washers 1318. The outer case 1313 and the lower cabinet 1316 are both fastened to the base 1314 using at least one, but preferably eight self-tapping screws 1321 or the like. Each of the lower cabinet 1316 and the outer case 1313 has a hole 1322 allowing the power cord of the self-regulating heating unit 1301 to be connected to a power supply (not shown).

Figure 15:
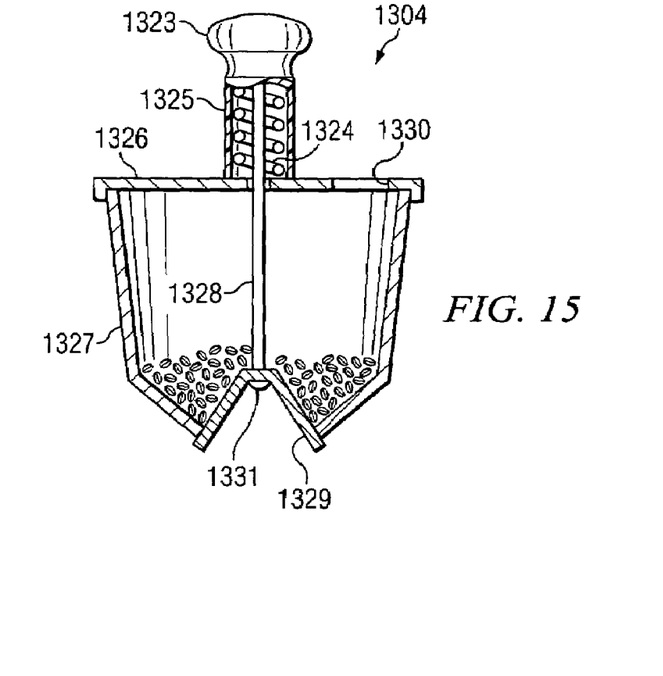
FIG. 15 illustrates a pre-heating storage of the rotary table loading system.

FIG. 15 illustrates a pre-heating storage of the rotary table loading system 1303 described in the FIG. 13. The pre-heating storage unit 1304 is configured to contain the kernels of corn and allow the kernels of corn to be deposited onto the heating chamber 1300 and particularly, into the vessel 1302. The pre-heating storage unit includes a knob 1323, a spring 1324, a tube 1325, a lid 1326, a cup 1327, a shaft 1328, and a cap 1329. The cup 1327 is open-ended at the top and the bottom. The lid 1326 covers the top of the cup 1327. The cap 1329 covers the bottom of the cup 1327. The lid 1326 has at least one opening 1330 to allow the kernels of corn to be deposited into the cup 1327 and at least one hole at its center for a shaft to be traversed. Immediately above the center of the lid 1326 is the spring 1324 surrounded by the tube 1325 for aesthetic. The tube 1325 can be made using elastic material or the like. The knob 1323 is attached to the shaft 1328 directly above the tube 1325 and the spring 1324. The knob 1323 is connected to the cap 1329 by a shaft 1328 through the hole at the center of the lid 1326. The shaft 1328 is secured to the cap 1329 by at least one machine screw 1331.

Figure 16:
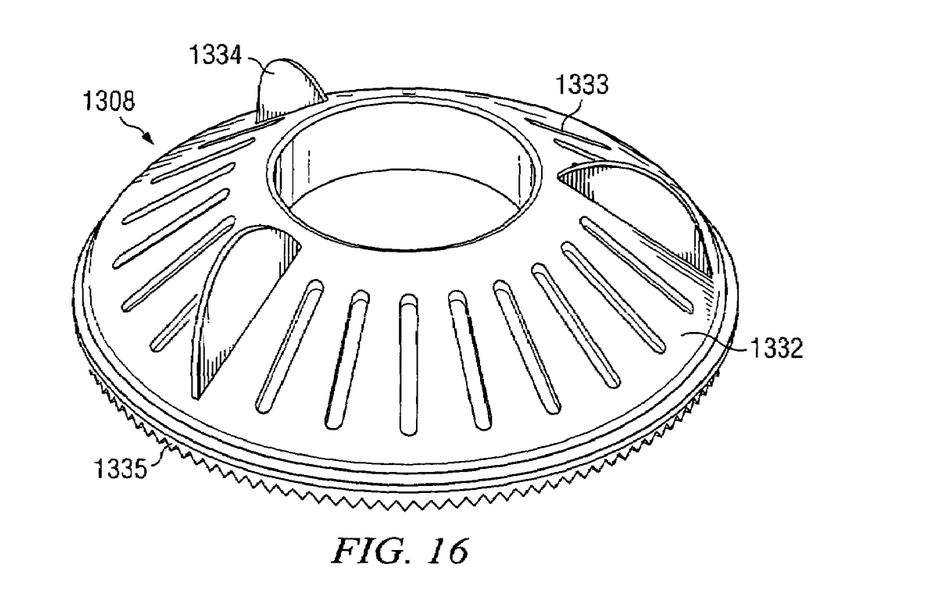
FIG. 16 illustrates an exemplary rotary table for the rotary table loading system.

FIG. 16 illustrates an exemplary rotary table for a rotary table loading system 1308. The rotary table 1332 includes an annulus having an inclined surface descending from its center with at least one slot 1333 and at least one rib 1334 being distributed thereon. The center of the rotary table 1308 has an opening, which is equal to or slightly greater than the outer case 1313 in the heating chamber to allow the popped kernels of corn to "pop" out of the heating chamber onto the rotary table 1332. The inclined surface provides a slope so that the popped kernels of corn can move towards the end of the surface by gravitational force and pile up at the end. The slots 1333 allow the hot air from the heating chamber to escape into the clear cabinet 1305 so as to maintain the temperature of the popped corns therein and at the same time reduce the temperature of the heating chamber 1300. This prevents the hot air from accumulating inside the heating chamber 1300. The rib 1334 assists in loading the popped kernels of corn to the outlet (not shown) of the rotary loading system 1308. Along the lower end of the rotary table is a set of toothed wheels 1335. The size of the tooth on the toothed wheels matches that of a gear in the handle unit (not shown).

Figure 17:
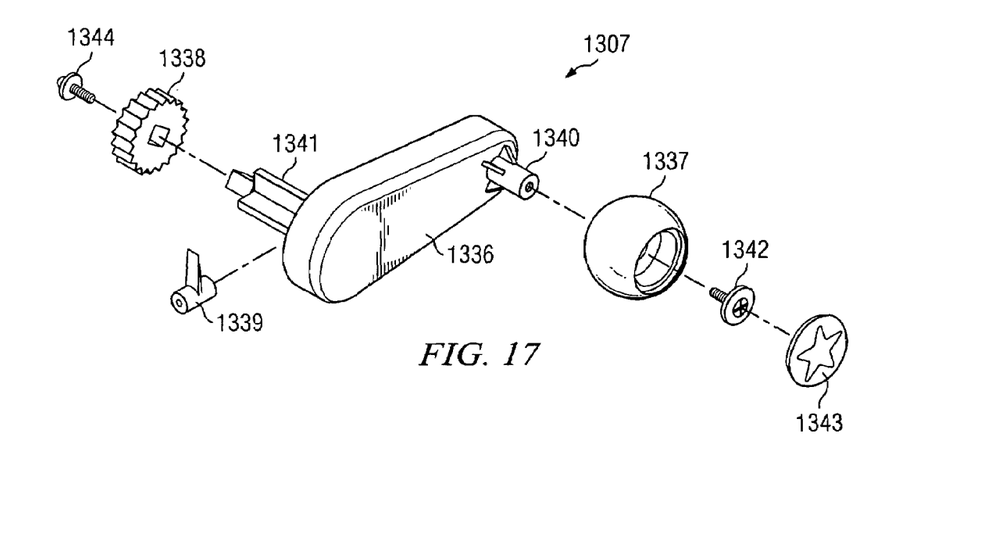
FIG. 17 illustrates a front view and a back view of an exemplary handling unit for the rotary table loading system.

FIG. 17 illustrates a front view and a back view of an exemplary handle unit for the rotary table loading system. The rotary table loading system includes a handle unit 1307. The handle unit 1307 includes a handle frame 1336, a knob 1337, at least one gear 1338, and a sound plate 1339. The frame 1336 includes at least one protrusion 1340 and 1341 placed on each side. The protrusion 1340 on the outer side allows a knob 1337 to be attached to the handle frame 1336 with a screw 1342. A cover plate 1343 is employed to cover the screw after the screw is inserted into the protrusion 1340 of the handle frame through the knob 1337. On the inner side of the handle frame 1336, a gear 1338 is put around the protrusion 1341 and is secured by a screw 1344. The protrusion 1341 on the inner side of the handle frame 1336 is in the shape of a cross. A sound plate 1339 is posed directly below the protrusion on the inner side of the handle frame 1336 and stands upright with its apex just reaching or slightly above the lower side of the protrusion 1341. When the handle unit 1307 rotates and so does the handle frame 1336 and the protrusion 1341 on the inner side of the handle frame, the sound plate 1339 generates a sound for example, a "click" sound or the like.

Figure 18:
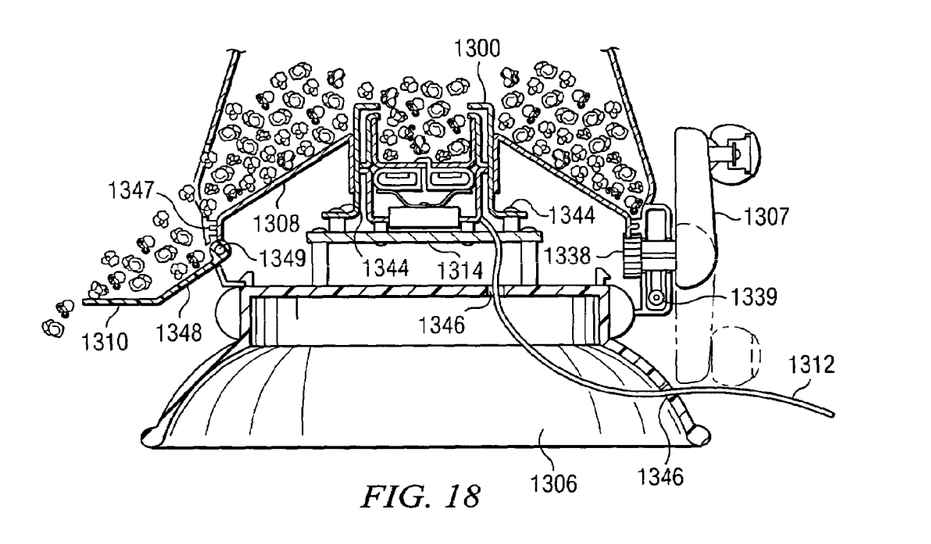
FIG. 18 illustrates a cross-sectional view of the rotary table loading system.

FIG. 18 illustrates a cross-sectional view of a popcorn maker with a rotary table loading system. The handle unit 1307 is mounted on the foundation 1306 and the rotary table 1308. The handle unit 1307 is mounted on the foundation 1306 with the protrusion 1341 on the inner side of the handle frame 1336 passing through one side of the foundation 1306 to the rotary table 1308. A sound plate 1339 stands upright with its apex just reaching or slightly above the lower side of the protrusion. The gear 1338 associated with the handle unit 1336 is fastened on toothed wheel 1335 on the lower end of the rotary table. Because the size of the teeth on the gear and that of the toothed wheel are well matched, when the user turns the handle unit 1307 and thus the gear therein, the rotary table is rotated accordingly and the sound plates produces a sound such as, a "click" sound.

The heating chamber 1300 rests on the foundation 1306 and is supported by at least one screw post 1344. The screw post 1344 and the base 1314 of the heating chamber are affixed together by at least one screw 1345. The foundation 1306 contains at least one hole 1346 enabling the power cord 1312 of the self-regulating heating unit to be connected to a power supply (not shown). The rotary table 1308 is placed directly above the heating chamber 1300 with the outer case 1313 and the upper cabinet 1315 standing partially out of the rotary table 1308 through the concentric hole of the rotary table. The rotary table is supported by a support slot 1347 from the clear cabinet 1305 and a gear 1338 of the handling unit 1307. A clear cabinet covers the heating chamber 1300 and the foundation 1306.

A pre-heating storage unit (not shown) is situated at the top of the clear cabinet. Alongside the foundation 1306 are the handling unit 1307 and an outlet device 1310. Although it is shown that the handling unit and the outlet device are situated opposite to each other, they can be posed at any position along the foundation 1306. The outlet device 1310 includes at least one slot (not shown) on one side of the foundation and a swinging door 1348. The swinging door 1348 covers the slots and forms a part of the foundation 1306. The swinging door 1348 is secured to the foundation 1306 by a hinge 1349 enabling the door to swing outwardly. When the swinging door is opened, a passage for the popped kernels of corn is formed and the popped kernel of corn drop out of the heating chamber from the slots. The size of the slots is large enough to allow the popped kernels of corn to pass through the slots yet small enough to prevent anything such as, a child's finger to enter into the heating chamber.

Referring to FIGS. 13–18, a user can deposit the kernels of corn in the storage unit via the opening. The pre-heating storage unit is held directly above the heating chamber unit so that the user can deposit the kernels of corn into the heating chamber by simply pushing the knob downwards to force open the cap at the bottom. The kernels of corn contained therein fall onto the heating chamber. When the knob is released, it returns to its original position due to the elastic force from the spring and thus, the cap closes. The user can turn-on the self-regulating heating unit to supply heat to the heating chamber. When substantially all the kernels of corn are popped onto the rotary table, the user can turn-off the self-regulating heating unit. The rotary table has an inclined surface descending from the center towards the ends. The inclined surface enables the popped kernels of corn to pile up along the ends. The user can collect the popped kernels of corn by opening the swinging door of the outlet device. When the swinging door is opened, it forms a passage. Due to the inclined surface of the rotary table and the gravitational force, the popped kernels of corn fall out of the rotary table onto the passage. The user can rotate the rotary table using the handling unit to ensure that substantially all the popped kernels of corn on the rotary table fall out of the device through the outlet.

The self-regulating heating unit can provide a regulated heat to control the temperature of the cabinet. The temperature of the cabinet can be kept below 100° C., preferably about 60° C., and more preferably below 55° C. The self-regulating heating unit also provides fast heat-up/cool-down for the heating chamber. The self-regulating heating unit has an intrinsic cutoff temperature that is high enough to pop the kernels of corn and low enough to prevent deterioration of any component of the popcorn maker. The power consumption and heat output is relatively low. The self-regulating heating unit replaces heating coils and open fire system required in conventional popcorn makers. The present invention can be produced economically, in a more compact size.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

The section headings in this application are provided for consistency with the parts of an application suggested under 37 CFR 1.77 or otherwise to provide organizational cues. These headings shall not limit or characterize the invention (s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. A popcorn maker comprising:
   a heating chamber, wherein the heating chamber comprises,
      a vessel, and
      a self-regulating heating unit coupled to the vessel, wherein the self-regulating heating unit is configured to provide a regulated heat to the vessel; and
   a rotary table loading system coupled to the heating chamber, the rotary table loading system comprising:
      a foundation unit,
      at least one handle unit coupled to the foundation unit,
      a rotary table operably coupled to the handle unit,
      a cabinet coupled to the foundation unit and covering the rotary table, and
      a pre-heating storage unit coupled to the cabinet, wherein the cabinet includes an outlet.

2. A popcorn maker according to claim 1, wherein the self-regulating heating unit is a positive temperature coefficient heating unit.

3. A popcorn maker according to claim 1, wherein the self-regulating heating unit includes a positive temperature coefficient thermistor.

4. A popcorn maker according to claim 1, wherein the vessel is made with a thermal conductive material selected from the group consisting of aluminum, aluminum alloy, copper, copper alloy, iron, and stainless steel.

5. A popcorn maker according to claim 1, further comprising:
   an upper cabinet, wherein the upper cabinet includes the heating chamber;
   a lower cabinet, coupled to the upper cabinet;
   an outer case, wherein the outer case includes the upper cabinet and the lower cabinet; and
   a base, coupled to the outer case.

6. A popcorn maker according to claim 1, wherein the pre-heating storage unit comprises:
   a cup, wherein the cup has a first open end and a second open end;
   a lid covering the first open end of the cup;

a cap covering the second open end of the cup;
a shaft, wherein a first end of the shaft is coupled to the cap;
a knob coupled to a second end of the shaft, wherein the shaft traverses through the lid;
a spring partially enclosing the shaft above the lid; and
a tube enclosing the spring.

7. A popcorn maker according to claim 1, wherein the rotary table comprises:
an annulus having an inclined surface descending from its center with at least one slot;
at least one rib coupled to the annulus; and
a set of toothed wheels at the lower end of the rotary table.

8. A popcorn maker according to claim 1, wherein the at least one handle unit comprises:
a handle frame;
at least one protrusion on an outer side of the handle frame;
at least one protrusion on an inner side of the handle frame;
a knob coupled to the at least one protrusion on the outer side of the handle frame;
a sound plate coupled to the inner side of the handle frame; and
at least one gear operably coupled to the at least one protrusion on the inner side of the handle frame.

9. A popcorn maker according to claim 1, wherein the outlet comprises a swinging door coupled to the cabinet via a hinge.

10. A method for making popcorn comprising:
loading kernels of corn into a heating chamber of a popcorn maker using a rotary table loading system coupled to the heating chamber, the rotary table loading system comprising:
a foundation unit,
at least one handle unit coupled to the foundation unit,
a rotary table operably coupled to the handle unit,
a cabinet coupled to the foundation unit and covering the rotary table, and
a pre-heating storage unit coupled to the cabinet, wherein the cabinet includes an outlet:
heating the kernels of corn to a regulated temperature in the heating chamber using a self-regulating heating unit;
maintaining the regulated temperature in the heating chamber;
popping the kernels of corn in the heating chamber; and
removing popped kernels of corn from the heating chamber.

11. A method according to claim 10, wherein the self-regulating heating unit is a positive temperature coefficient heating unit.

12. A method according to claim 10, wherein the self regulating heating unit includes a positive temperature coefficient thermistor.

* * * * *